United States Patent
Ananny et al.

(10) Patent No.: US 8,559,575 B2
(45) Date of Patent: Oct. 15, 2013

(54) MICROCONTROLLER CLOCK CALIBRATION USING DATA TRANSMISSION FROM AN ACCURATE THIRD PARTY

(75) Inventors: John M. Ananny, San Francisco, CA (US); Nicholas R. Kalayjian, San Carlos, CA (US); Stanley Rabu, Santa Clara, CA (US); Terry Tikalsky, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1610 days.

(21) Appl. No.: 12/004,335

(22) Filed: Dec. 19, 2007

(65) Prior Publication Data

US 2009/0161806 A1 Jun. 25, 2009

(51) Int. Cl.
*H04L 7/00* (2006.01)

(52) U.S. Cl.
USPC .............................. 375/354; 375/376; 375/374

(58) Field of Classification Search
USPC .................. 375/355, 354, 376, 374; 327/141; 370/503; 714/12
See application file for complete search history.

(56) References Cited

U.S. PATENT DOCUMENTS

| | | | |
|---|---|---|---|
| 5,903,316 A * | 5/1999 | Hattori et al. ................ | 348/571 |
| 6,154,512 A * | 11/2000 | Homan ........................ | 375/376 |
| 6,598,533 B1 * | 7/2003 | Kolbli .......................... | 102/215 |
| 6,674,821 B1 * | 1/2004 | Mejyr .......................... | 375/354 |
| 6,922,388 B1 * | 7/2005 | Laroia et al. ................. | 370/208 |
| 7,133,398 B2 * | 11/2006 | Allen et al. .................. | 370/350 |
| 7,243,036 B2 * | 7/2007 | Boeh ............................ | 702/106 |
| 7,643,895 B2 * | 1/2010 | Gupta et al. ................. | 700/94 |
| 7,970,090 B1 * | 6/2011 | Tetzlaff ........................ | 375/359 |
| 8,046,185 B1 * | 10/2011 | Chui ............................. | 702/89 |
| 2002/0103008 A1 * | 8/2002 | Rahn et al. ................... | 455/557 |
| 2003/0185170 A1 * | 10/2003 | Allen et al. .................. | 370/329 |
| 2006/0143455 A1 * | 6/2006 | Gitzinger .................... | 713/170 |
| 2006/0205373 A1 * | 9/2006 | Lu ............................... | 455/255 |
| 2008/0119241 A1 * | 5/2008 | Dorogusker et al. ......... | 455/573 |
| 2008/0164934 A1 | 7/2008 | Hankey et al. | |
| 2008/0167088 A1 | 7/2008 | Rabu et al. | |
| 2008/0285467 A1 * | 11/2008 | Olgaard ........................ | 370/242 |

* cited by examiner

*Primary Examiner* — Shuwang Liu
*Assistant Examiner* — Helene Tayong
(74) *Attorney, Agent, or Firm* — Womble Carlyle Sandridge & Rice LLP

(57) ABSTRACT

Systems and methods are provided for calibrating the internal oscillator of a microcontroller from a remote clock source. In some embodiments, an electronic device can request timing information from a third party device using a timing independent signal. The timing information received from the third party device may be used to calibrate the microcontroller clock of the electronic device. In some embodiments, the internal oscillator may be calibrated based on timing information received from multiple third party devices. Once calibrated, the microcontroller may initiate timing dependent communication with other electronic devices using a timing dependent protocol, such as a serial protocol.

25 Claims, 12 Drawing Sheets

MICROCONTROLLER CLOCK CALIBRATION USING DATA TRANSMISSION FROM AN ACCURATE THIRD PARTY

FIELD OF THE INVENTION

This can relate to clocking for electronic devices and, more particularly, to obtaining a reliable clock signal from a third party electronic device for microcontroller clock calibration.

BACKGROUND OF THE DISCLOSURE

Currently, there are a wide variety of electronic devices in everyday use. For example, many individuals own cellular telephones and portable media players for on-the-go communication and entertainment. There are even electronic devices that are specifically designed to be accessory devices to other electronic devices, such as wireless Bluetooth™ headsets for cellular telephones. These accessory devices may enhance the functionality, convenience, or aesthetics of another electronic device. For example, a wireless Bluetooth™ headset may enhance the use of a cellular telephone by allowing users to have a hands-free, wireless conversation through their cellular telephone. Similarly, a docking device may be an accessory to a portable media player, where the docking device is used to update and provide power to the portable media player.

Two or more electronic devices, such as a device and its accessory device, can communicate using an established protocol. For example, the devices may communicate using a serial interface, such as a universal serial bus ("USB") interface. For USB protocols and other serial protocols, the transfer of information occurs at an agreed upon data rate. If either device loses its ability to accurately transmit or receive information at that data rate, synchronization may be lost and communication may cease. Therefore, each of the devices typically includes a reliable clock source for use in maintaining data transfer at the agreed upon data rate. Electronic devices often use crystal oscillators as this reliable clock source.

Although crystal oscillators are reliable and accurate, they have several disadvantages. First, they are large components. For a portable device, where size is a crucial factor in its design, having such a large component in the device is highly undesirable. Moreover, crystal oscillators are typically expensive components and are also a common source of manufacturing defects in commercial electronic devices. Accordingly, it would be beneficial to be able to provide an approach for a microcontroller-based electronic device to accurately transmit and receive serial data without including an extra clock source.

SUMMARY OF THE DISCLOSURE

Systems and methods are provided for calibrating the internal oscillator of a microcontroller based on a remote clock source.

In one embodiment of the invention, timing dependent communication between a first electronic device and a second electronic device can be enabled. A timing independent signal may be transmitted from the first device to a third party device to request transmission of timing information, and a clock source of the first device can be calibrated based on the timing information transmitted from the third party device and received by the first device. Then, timing dependent communication may be conducted between the first device and the second device, where the data rate of the timing dependent communication is based on a clock rate of the clock source.

In another embodiment of the invention, timing information can be transmitted from a first electronic device to a second electronic device. The first device can include a reliable clock source, such as a crystal oscillator, and the second device can include a microcontroller with an internal oscillator. First, a timing independent signal can be received with the first device from the second device. A request for timing information can be detected with the first device from the received timing independent signal. For example, the first device can detect a request by detecting a voltage change of the timing independent signal. Timing information may then be transmitted from the first device to the second device. The timing information may be derived from the reliable clock source of the first device, and the timing information may be used by the second device to calibrate the internal oscillator of its microcontroller.

In still another embodiment of the invention, a system is provided that can include a third party device and a first electronic device coupled to the third party device. The third party device can include a reliable clock source and can be configured to transmit timing information that is derived from the reliable clock source in response to receiving a timing independent request. The third party device may be, for example, a wireless headset with a crystal oscillator as its reliable clock source. The first device can include a microcontroller with an internal oscillator. The first device can be configured to transmit the timing independent request to the third party device and calibrate the internal oscillator with the timing information received from the third party device. The first device may be, for example, a docking device adapted to be an accessory device for the third party device.

The system may further include a second electronic device that can communicate with the first device. The first and second devices may communicate using a timing dependent protocol, such as a USB protocol. The second device may be, for example, a portable media player, and the first device may be a docking device adapted to be an accessory device for the portable media player.

In still another embodiment of the invention, an electronic device is provided that can include a first and a second communication link. The first communication link can be adapted to transmit a request for timing information using a timing independent protocol, and the second communication link can be adapted to receive the timing information. The electronic device can also include a microcontroller that can control operations of the electronic device. An internal oscillator of the microcontroller can be calibrated based on the received timing information.

The electronic device may also include a regulator and a switch. The regulator can provide a first voltage and a second voltage different from the first voltage. The switch can selectively provide one of the voltages to the first communication link. The request for timing information may be transmitted from the first communication link by changing a state of the switch for a period of time.

In still another embodiment of the invention, a clock source of a first electronic device can be calibrated for use in enabling timing dependent communication between the first electronic device and a second electronic device. A request for timing signals can be transmitted from the first device to a plurality of third party devices using a timing independent protocol. In response to the request, a plurality of timing signals may be received with the first device from the plurality of third party devices, and the first device can derive timing information from at least a subset of the timing signals. For example, the timing information may be derived by averaging the at least a subset of the timing signals. Then, the clock source of the first device may be calibrated based on the timing information.

BRIEF DESCRIPTION OF THE DRAWINGS

The above and other aspects and advantages of the invention will become more apparent upon consideration of the following detailed description, taken in conjunction with the accompanying drawings, in which like reference characters refer to like parts throughout, and in which.

DETAILED DESCRIPTION OF THE DISCLOSURE

Figure 1:
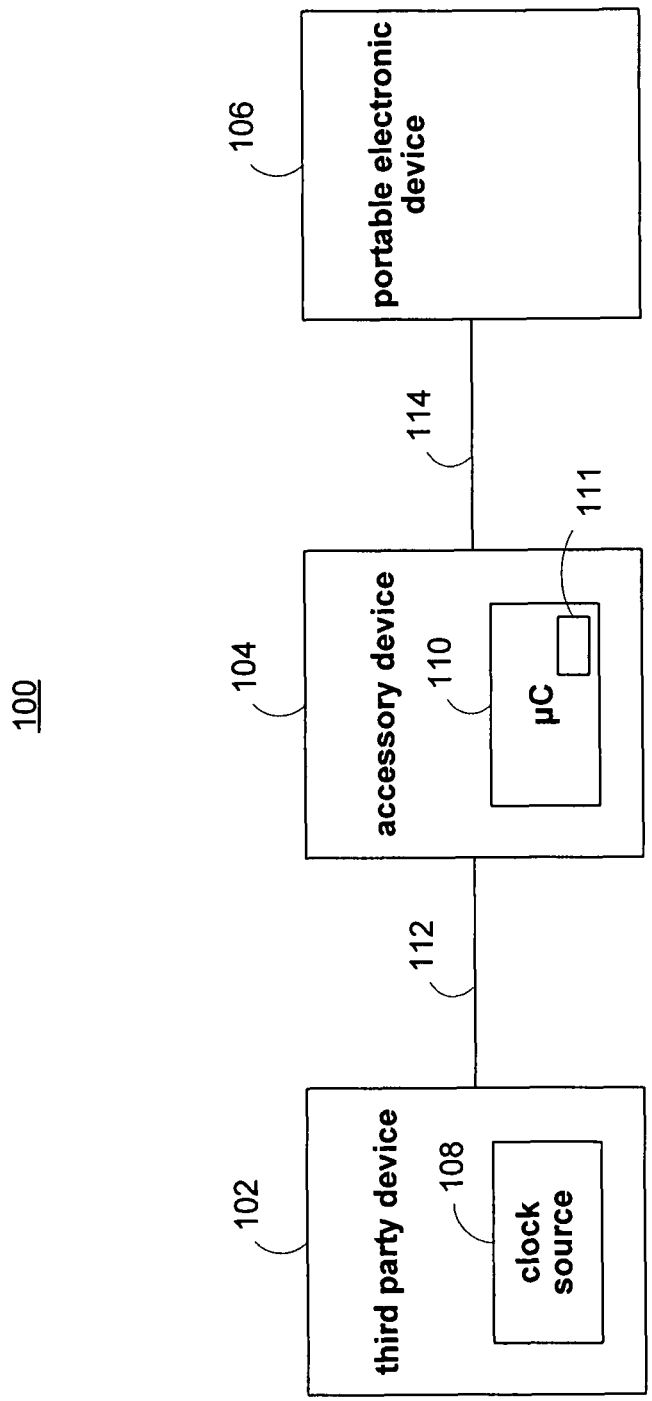
FIG. 1 shows a simplified system diagram in accordance with an embodiment of the invention.

An electronic device in accordance with an embodiment of the invention can include a microcontroller for controlling the basic operation of the electronic device. In some embodiments, the electronic device may be an accessory device, such as a microcontroller-based docking device for one or more other electronic devices. The microcontroller of the electronic device may have an internal oscillator, sometimes referred to herein as a microcontroller clock, that relies on a reliable clock source for maintaining a consistent and accurate frequency.

Instead of including a reliable clock source on the electronic device to calibrate the microcontroller clock, a clocking signal may be obtained from another electronic device that has a reliable clock source. The other electronic device may be, for example, a Bluetooth™ wireless device having a crystal oscillator. In the embodiment where the microcontroller-based electronic device is a docking device, this other electronic device may be one of the devices that couples to the docking device. The other electronic device may be sometimes referred to herein as a "third party device," because, in some embodiments, and for any given period of time, the third party device may not communicate with the electronic device other than to provide a clocking signal. However, the term "third party" is not intended to limit the invention to any particular type of device, or to any particular functionality other than providing a clocking signal.

The electronic device can request transmission of timing information (e.g., a clocking signal) for microcontroller clock calibration from the third party device. The electronic device may request timing information, for example, when it is no longer able to partake in timing-based communication or "timing dependent communication" (e.g., USB) with other devices. Alternatively, the electronic device may request timing information periodically irrespective of its ability to partake in timing dependent communication. In some embodiments, the electronic device may provide power to the third party device, and may transmit a request for timing information by changing the voltage on the power line from, for example, 5 volts to 3.3 volts for a period of time sufficient for the third party device to detect the change. This or any other voltage-based out-of-band signaling technique does not depend on the data rate of the transmitted request, and therefore may be referred to as "timing independent." A timing independent protocol can be advantageous, as accurate transmission of the request does not rely on the microcontroller clock having an accurate frequency.

In response to detecting the voltage change, the third party device may begin transmitting timing information. The transmission rate of the timing information may depend on the rate of the reliable clock source of the third party device. The electronic device can use the received timing information to calibrate the internal oscillator of its microcontroller. After proper calibration, the microcontroller clock may be sufficiently accurate to perform any suitable timing dependent functions. For example, the electronic device can initiate timing dependent communication with a second electronic device, which may be the third party device or a different electronic device. After a predetermined period of time, or if proper communication ceases unexpectedly, the electronic device may again request timing information from the third party device.

In some embodiments, the electronic device may derive timing information for its microcontroller clock from multiple signals received from different third party devices. The electronic device can, for example, average the received signals to produce the timing information. In addition, one or more of the signals can be selected based on any suitable criteria, such as the magnitude of the received signals or the priority of the ports from which the signals were received.

Methods and systems for calibrating the internal oscillator of a microcontroller based on a remote clock source are provided and described with reference to FIGS. 1-12.

FIG. 1 shows a simplified block diagram of system 100, and is intended to represent any collection of two or more electronic devices that are configured to communicate with one another in accordance with the invention. In the illustrated embodiment, system 100 includes three electronic devices: third party device 102, accessory device 104, and portable electronic device 106.

Third party device 102 can be any suitable electronic device that includes a clock source 108. Clock source 108 may be a crystal oscillator or any other source that can reliably provide an accurate clock signal at a fixed or controllable frequency. Third party device 102 can use the signal provided by clock source 108 to derive and transmit a clocking signal to accessory device 104, and to enable its own timing dependent communication. For example, third party device 102 can be a wireless headset that uses its reliable clock source for USB communication. In this embodiment, third party device 102 may have any of the components, features, or functionalities of the wireless headsets discussed in commonly assigned U.S. Patent Application Publication No. 2008/0164934, published Jul. 10, 2008 (hereinafter "the headset application"), which is hereby incorporated herein by reference in its entirety.

Accessory device 104 can be any suitable microcontroller-based electronic device, and can include a microcontroller 110 for controlling the basic operation of the device. In some embodiments, accessory device 104 may be a docking device-type accessory for portable electronic device 106 and/or third party device 102. For example, accessory device 104 may have any of the components, features, or functionalities of the docking devices discussed in co-pending, commonly assigned U.S. Patent Application Publication No. 2008/0167088, published Jul. 10, 2008 (hereinafter "the docking application"), which issued Dec. 27, 2011 as U.S. Pat. No. 8,086,281, and which is hereby incorporated herein by reference in its entirety.

Microcontroller 110 of accessory device 104 may be any suitable microcontroller that can use a clock source external to microcontroller 110 to calibrate its internal oscillator 111. As described above, accessory device 104 can obtain timing information from third party device 102, and can calibrate microcontroller 110 based on the received clocking signal. Thus, the signal used by microcontroller 110 to calibrate its internal oscillator 111 may be based on the reliable clock signal of clock source 108. This signal obtained from third party device 102 may be sometimes referred to herein as "timing information." Because the timing information is timing dependent, the timing information may also be referred to as a "timing dependent signal" or simply a "timing signal."

Portable electronic device 106 can be any suitable electronic device capable of communicating with accessory device 104. Portable electronic device 106 may communicate with accessory device 104 to obtain updates, information, or power. For example, portable electronic device 106 may be a portable media player (e.g., an iPod™) or a cellular telephone (e.g., an iPhone™) that can obtain power, media file downloads, software updates, user preference settings, synchronization settings, or any other suitable information from accessory device 104. In some embodiments, portable electronic device 106 may not be "portable," but may be designed for use in a fixed location.

As shown in FIG. 1, third party device 102, accessory device 104, and electronic device 106 may be coupled via communications links. In particular, third party device 102 may communicate with accessory device 104 via communications link 112, and accessory device 104 may communicate with electronic device 106 via communications link 114. Communications links 112 and 114 can include any number and combination of suitable wired or wireless paths for enabling timing independent or timing dependent communication. Communications links 112 and 114 can include power lines, serial data lines, coaxial cables, standard cables for given communications protocols, or space for wireless data transmission. Although not shown in FIG. 1, in some embodiments, third party device 102 may directly communicate with portable electronic device 106 through another communications link. Alternatively, third party device 102 may indirectly communicate with portable electronic device 106 through accessory device 104 and communications links 112 and 114.

In some embodiments, accessory device 104 may communicate with portable electronic device 106 using a serial interface or another timing dependent interface. Thus, communication between these devices may rely on the ability of accessory device 104 and portable electronic device 106 to maintain an agreed upon data rate. Because accessory device 104 may not include a reliable clock source (e.g., a crystal oscillator) for clocking microcontroller 110, the internal oscillator of microcontroller 110 may be susceptive to deviation from its normal frequency, thereby potentially preventing reliable communication between the two devices. To maintain reliable communication, accessory device 104 may request timing information from third party device 102 for use in recalibrating its microcontroller clock 111. However, especially in cases where communication ceases between accessory device 104 and portable electronic device 106, timing dependent communication also may not be possible between third party device 102 and accessory device 104. Thus, in various embodiments of the invention, accessory device 104 can be configured to transmit to third party device 102 a timing independent request for timing information. Third party device 102 may be configured to detect the timing independent request, and, in response, may transmit timing information to accessory device 104. An example of this approach is illustrated in FIG. 2.

Figure 2:
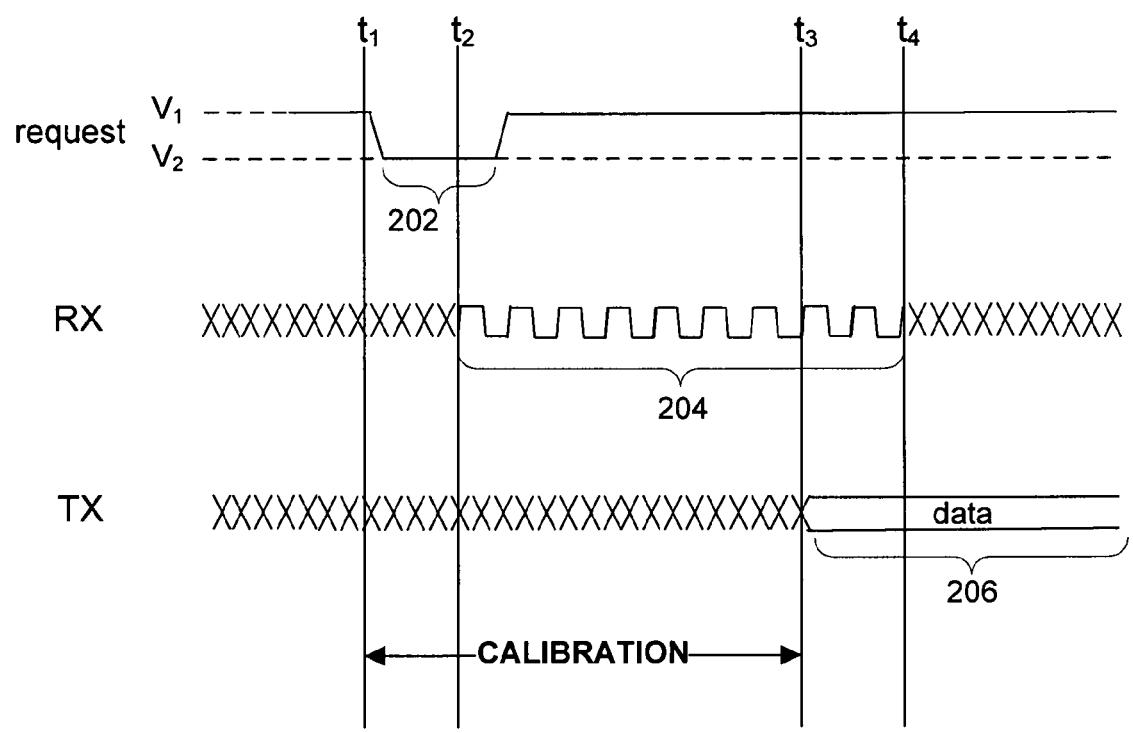
FIG. 2 shows an illustrative timing diagram for calibrating a microcontroller clock in accordance with an embodiment of the invention.

FIG. 2 shows timing diagram 200 that illustrates one approach for accessory device 104 to reliably request and obtain timing information from third party device 102, and will be described with continuing reference to FIG. 1. Timing diagram 200 illustrates three signals: the first ("request") representing a request for timing information that may be transmitted from accessory device 104 to third party device 102, the second ("RX") representing timing information that may be received by accessory device 104 from third party device 102, and the third ("TX") representing a timing dependent signal that may be transmitted by accessory device 104 at the completion of clock calibration. For clarity, the description below of timing diagram 200, and any other timing diagrams described herein, assumes that a signal transmitted from one device is the same signal received by the other device, and vice versa.

Accessory device 104 may initiate a request for timing information at some time, $t_1$. Accessory device 104 may automatically initiate a request, for example, when it is no longer able to communicate using a timing independent protocol, after a predetermined period of time, or when a previous attempt at clock calibration is unsuccessful. At time $t_1$, accessory device 104 may enter into a state, which may sometimes be referred to herein as a "CALIBRATION state," that can occur whenever accessory device 104 recalibrates its microcontroller clock 111. In CALIBRATION state, accessory device 104 may suspend any timing dependent functions, such as timing dependent communication with portable electronic device 106.

To request transmission of timing information from third party device 102, accessory device 104 may transmit a timing independent signal to third party device 102 at time $t_1$. Therefore, as described above, even if an internal oscillator of microcontroller 110 cannot maintain timing dependent communication, a request for timing information can still be reliably transmitted. In some embodiments, accessory device 104 may initiate the request at time $t_1$ by switching the request voltage from a first voltage $V_1$ to a second voltage $V_2$ for a period of time sufficient for third party device 102 to detect the change. The voltage change can create voltage pulse 202. For example, if third party device 102 detects the voltage change at some time $t_2$, pulse 202 may be of sufficient length to initiate transmission of timing information from third party device 102. This timing independent approach illustrates one form of timing independent communication that may be sometimes referred to herein as "level-based signaling." In other embodiments, transmission-based signaling, where third party device 102 may be configured to detect a transition in the request signal, may be used to communicate a request for timing information.

As described above, at time $t_2$, third party device 102 may determine that a request for timing information has been received. In response to receiving the request, third party device 102 may begin transmitting timing information 204 at time $t_2$. Timing information 204 can be any suitable signal that enables accessory device 104 to calibrate its microcontroller clock 111. In some embodiments, and as shown in FIG. 2, timing information 204 may be a clock signal with a 50% duty ratio. In other embodiments, timing information 204 may be a clock signal with a different duty ratio or a signal of another suitable sequence or pattern. Third party device 102 may transmit timing information 204 to accessory device 104 until a time, $t_4$. The amount of time timing information 204 is transferred, or $t_4$-$t_2$, may be a period of time sufficient for accessory device 104 to complete microcontroller clock calibration. For example, if accessory device 104 completes microcontroller clock calibration at time $t_3$, timing information 204 is transmitted for a sufficient amount of time.

With continuing reference to FIGS. 1 and 2, accessory device 104 may calibrate internal oscillator 111 of microcontroller 110 using timing information 204 received from third party device 102. Accessory device 104 may enable clock calibration to occur while in CALIBRATION state—that is, from time $t_1$ to a some later time, $t_3$. The time between $t_1$ and $t_3$ may be a predetermined amount time programmed or hardwired into accessory device 104, after which proper clock calibration is assumed to have been completed. If clock calibration is completed successfully, accessory device 104 may be capable of performing timing dependent tasks.

At time $t_3$, accessory device 104 may enter into a new state, which may sometimes be referred to herein as a "COMMUNICATION state." In this state, accessory device 104 may disable microcontroller clock calibration, and may initiate or resume any timing dependent tasks. For example, accessory device 104 can initiate timing dependent communication with portable electronic device 106, and can begin transmitting timing dependent data 206 to portable electronic device 106. Alternatively, accessory device 104 may begin exchanging information with a different device, check connections between various devices coupled to accessory device 104, establish connections between various devices, provide updates to various devices, facilitate transfer of data between various devices, etc. These and other tasks that can be performed by accessory device 104 are described in greater detail in the docking application, for example.

It should be understood that system 100 of FIG. 1 and timing diagram 200 of FIG. 2 are merely illustrative. In fact, system 100 can include any suitable number of electronic devices with any suitable number of communications links coupling them. Also, the above described embodiments of third party device 102, accessory device 104, and portable electronic device 106, as well as their functions as described in connection with FIG. 2, are merely illustrative. Devices 102, 104, and 106 can each be any suitable electronic device capable of communicating with one or more other devices, and do not necessarily have a device-accessory relationship. For example, and where appropriate, each of third party device 102, accessory device 104, portable electronic device 106, and any other device in communication with system 100 (not shown) may be any suitable portable or stationary electronic device, including but not limited a laptop computer, a desktop computer, an audio player (e.g., a Walkman™, compact disc player, etc.), a video player, a media player (e.g., an iPod™, etc.), a set top box, a portable video game system (e.g., Sony's PSP™, Nintendo's Game Boy™, etc.), an electronic book, a cellular telephone, a wireless telephone, a hand held computer, a global positioning system ("GPS") device, a personal digital assistant ("PDA") (e.g., Palm's Pilot™, etc.), a wireless headset for a telephone, a satellite radio, a remote control, an automobile key fob, a printer, an automobile radio, an automobile computing system, an automobile cigarette lighter (or other mobile power source, such as an airplane cigarette lighter), a camera, an accessory device for a computer (e.g., a wireless mouse, wireless keyboard, etc.), a watch, a surge protector, an AC/DC converter, etc.

Figure 3:
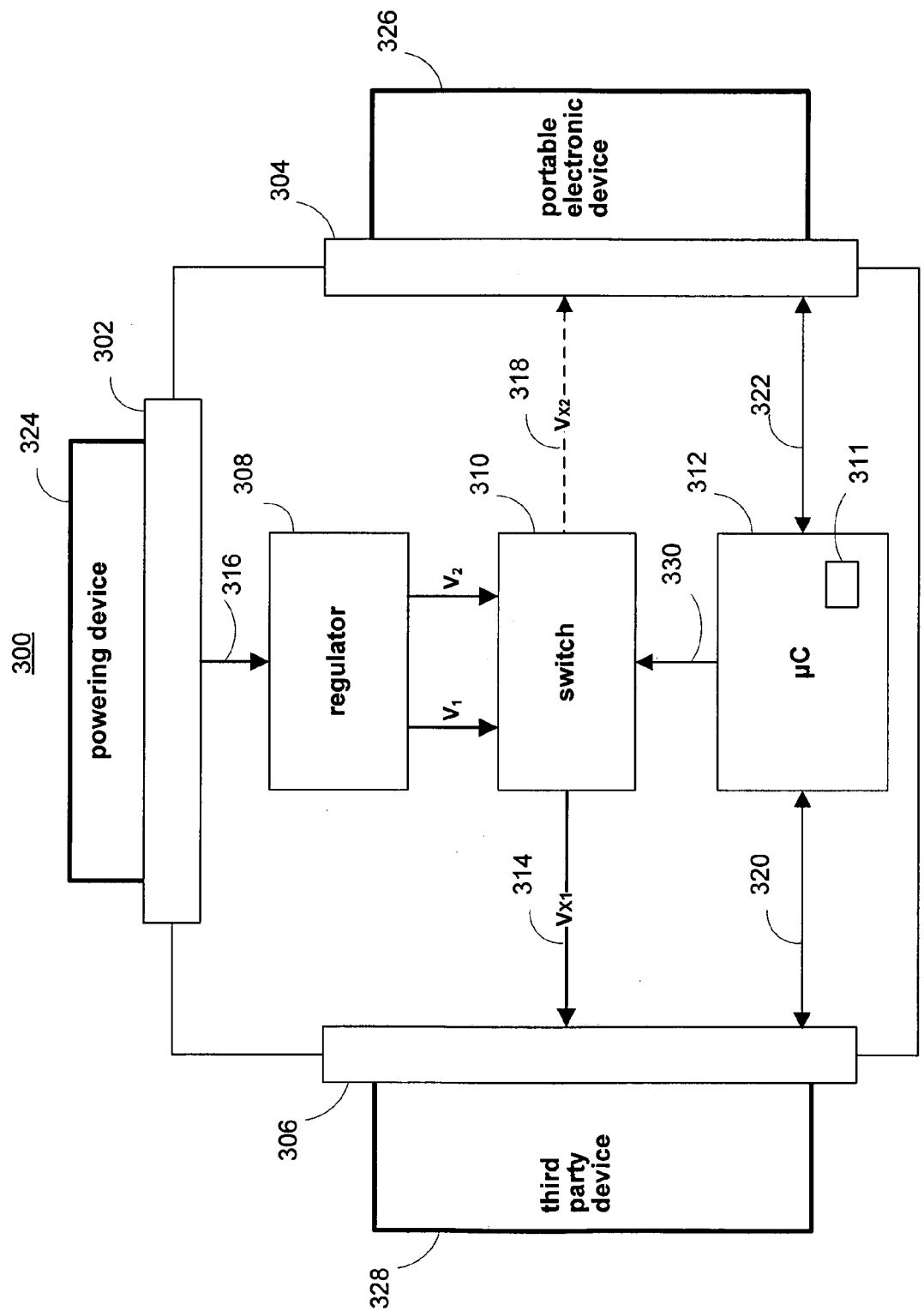
FIG. 3 shows a simplified block diagram of an electronic device in accordance with an embodiment of the invention.
Figure 4:
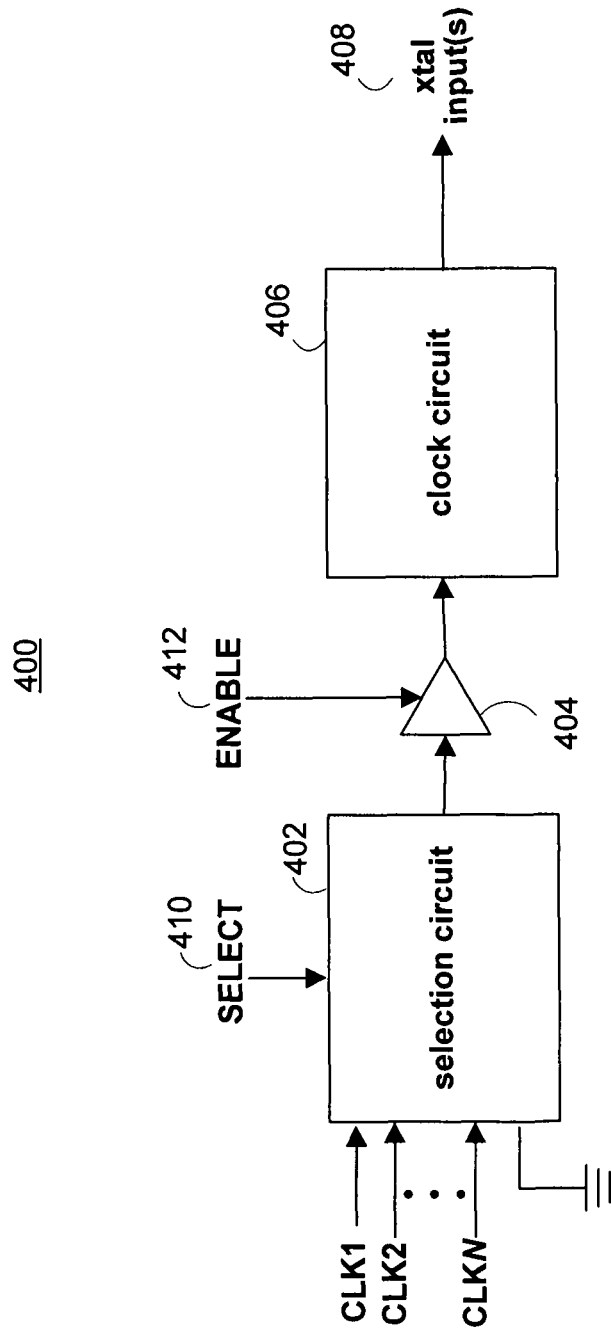
FIG. 4 shows a simplified circuit for providing a clock signal for a microcontroller in accordance with an embodiment of the invention.
Figure 5:
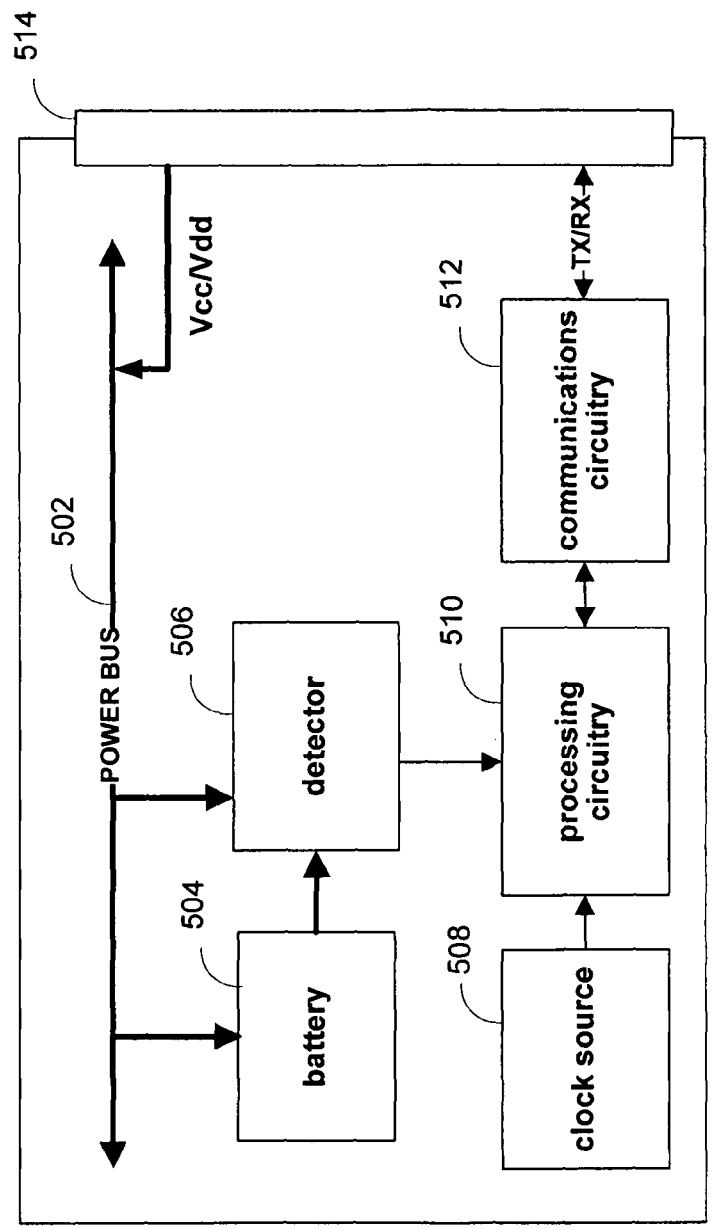
FIG. 5 shows a simplified block diagram of a third party electronic device in accordance with an embodiment of the invention.

FIGS. 3-5 show illustrative embodiments of electronic devices capable of operating in accordance with the invention. In particular, FIG. 3 shows an illustrative block diagram of a microcontroller-based electronic device capable of transmitting a request for timing information. FIG. 4 shows an illustrative block diagram of a clock calibration circuit for processing received timing information, which can be implemented on the electronic device of FIG. 3. Finally, FIG. 5 shows an illustrative block diagram of a third party device capable of detecting a request for timing information and transmitting timing information in response to detecting the request.

Referring first to FIG. 3, a simplified and illustrative block diagram of an accessory device 300 is shown. Accessory device 300 may be a more detailed, yet still simplified view, of accessory device 104 of FIG. 1. Accessory device 300 can include port 302, port 304, port 306, regulator 308, switch 310, and microcontroller 312. Device 300 can be implemented using a single integrated circuit or, for example, a multi-chip module including two or more separate integrated circuits. Also, as described above, although device 300 is referred to as an "accessory" device, this is merely one embodiment of device 300. Device 300 can be any suitable type of electronic device with any suitable relationship to the other electronic devices it may communicate with.

The block diagram of accessory device 300 is merely illustrative. For clarity, the components of accessory device 300 will be described below mainly in terms of the ability of device 300 to request timing information and to calibrate its microcontroller clock based on the received timing information. However, it should be understood that accessory device 300 can have many features and functionalities, and any additional components, such as those described in the docking application. Moreover, each component of accessory device 300 may have any of the features or embodiments described in connection with one or more corresponding components in the docking application.

Ports 302, 304, and 306 of accessory device 300 can each be any suitable type of wired or wireless port (e.g., a female USB connector, a male 30-pin connector, and a symmetrical 4-pin connector, respectively) that enables other electronic devices to be coupled to accessory device 300. Ports 302, 304, and 306 can respectively couple powering device 324, portable electronic device 326, and third party device 328 to accessory device 300. Powering device 324, coupled via port 302, may be any suitable type of electronic device discussed above, such as an AC adapter or a computer, that can provide power, among other things, to accessory device 300 via power supply line 316. Portable electronic device 326, coupled via port 304, can be similar in functionality to portable electronic device 106 of FIG. 1. That is, accessory device 300 may be operable to provide power, information, or updates to portable electronic device 326 via power supply line 318, for example. Third party device 328, coupled via port 306, may be similar in functionality to third party device 102 of FIG. 1. For example, third party device 328 may operate in conjunction with accessory device 300 to produce timing waveforms similar to those shown in timing diagram 200 of FIG. 2.

It should also be understood that, in some embodiments or in some operating scenarios, power may be provided to device 300 from portable electronic device 326 or third party device 328 in addition to or instead of from power device 324. Also, although only three ports are shown in FIG. 3, it should be understood that accessory device 300 may include any suitable number of ports that may couple any suitable number of devices to accessory device 300.

Microcontroller 312 may have the same or similar features and functionality as microcontroller 110 of FIG. 1. Microcontroller 312 may operate based on an internal oscillator 311 that relies on another clock source external to the microcontroller for maintaining an accurate frequency. For example, microcontroller 312 can be any suitable commercial 8-bit, 16-bit, or larger microcontroller (e.g., Intel's 8088, etc.) with one or more clock inputs for accepting timing information. Accessory device 300 may include one or more components that enable proper operation of microcontroller 312 (e.g., additional storage units for use as instruction or data memory). Accessory device 300 can obtain timing information from third party device 328. In some embodiments, accessory device 300 may obtain timing information from other devices as well.

Microcontroller 312 can facilitate the transfer of information and power among the devices coupled to accessory device 300. In particular, microcontroller 312 may facilitate the transfer of power from powering device 324 (via power supply line 316) to third party device 328 and portable electronic device 326 (via power supply line 314 and power supply line 318, respectively). Also, microcontroller 312 may be configured to transmit and receive information to and from and between portable electronic device 326 and third party device 328 via transmit/receive (TX/RX) line 322 and TX/RX line 320, respectively. TX/RX lines 320 and 322 can be bidirectional links or can include one or more separate transmit and receive links.

Information exchanged via TX/RX lines 320 and 322 can be exchanged using a timing dependent protocol (e.g., a serial protocol, such as a USB protocol), where the information data rate may be based on the internal oscillator 311 of microcontroller 312. Thus, the reliability of data transfer, and the ability to transfer data at all, may depend on the consistency and accuracy of the internal oscillator 311 of microcontroller 312. Because accessory device 300 may not include a reliable clock source for maintaining an accurate microcontroller clock frequency, accessory device 300 may request timing information from third party device 328, or any other device coupled to accessory device 300, whenever recalibration of the microcontroller clock 311 is necessary.

As described above, accessory device 300 may request timing information using a timing independent approach (e.g., a level-based or transition-based approach) to ensure that a request can be accurately transmitted even when the internal oscillator 311 of microcontroller 312 is inaccurate. In particular, accessory device 300 may transmit a request by changing power voltage $V_x$ provided to third party device 328 from a first voltage, $V_1$ to a second voltage, $V_2$, or vice versa. For example, $V_1$ may be the voltage typically provided to third party device 328 to power or charge the third party device 328. Microcontroller 312 can transmit a request by lowering the voltage typically provided to third party device 328 to a significantly lower voltage, $V_2$, for a predetermined period of time, for example. Microcontroller 312 can initiate this request by controlling switch 310 to select between outputs of regulator 308. In this way, microcontroller 312 can generate the request waveform shown in timing diagram 200 of FIG. 2.

Regulator 308 can regulate power obtained from powering device 324, or from any combination of devices coupled to accessory device 300, to obtain various voltages, such as voltages $V_1$ and $V_2$. These voltages may be used to power third party device 328 and portable electronic device 326, and may be used to transmit timing independent requests for timing information. $V_1$ and $V_2$ can be any standard power voltage, such as 3V, 3.3V, or 5V, or any nonstandard power voltage. For simplicity, it will be assumed that $V_1$ is greater than $V_2$. Thus, for example, $V_1$ may be 5 volts and may be the voltage typically supplied to third party device 328, while $V_2$ may be 3.3 volts. In some embodiments, regulator 308 may generate these two voltages by taking the voltage of power supply line 316 as $V_1$, and stepping down $V_1$ to obtain $V_2$. Alternatively, regulator 308 may take the voltage of power supply line 316 as $V_2$ and may boost $V_2$ to obtain $V_1$, or regulator 308 may derive both $V_1$ and $V_2$ from the voltage at power supply line 316 using some other suitable technique. Regulator 308 can be implemented using any suitable approach (e.g., a linear regulator, a buck/boost regulator, or any other PWM-based regulator, etc.), and is therefore not limited to any particular implementation.

Switch 310 of FIG. 3 can provide one of $V_1$ and $V_2$ as power supply voltage $V_x$ for third party device 328, and can be modeled as a single pole, double throw switch, for example. That is, in one state, switch 310 may couple the $V_1$ output of regulator 308 to power supply line 314, and in another state, switch 310 may couple the $V_2$ output of regulator 308 to power supply line 314. Thus, to initiate a request for timing information, microcontroller 312 can change the state of switch 310 using, for example, control line 330. This can allow microcontroller 312 to apply a pulse on voltage supply line 314 to third party device 328 for a time sufficient for third party device 328 to detect the level change (for level-based signaling) or the voltage transition (for transition-base signaling). It should be understood that switch 310 can be implemented using any suitable technique (e.g., a transistor-based switch), and is therefore not limited to any particular implementation.

Microcontroller 312 can receive the timing information from third party device 328 via TX/RX line 320, for example. Thus, in some embodiments, TX/RX line 320 may support both the transfer of data as well as the transfer of timing information. In these embodiments, TX/RX line 320 may be coupled not only to the data input/outputs ("I/Os") of microcontroller 312, but also directly or indirectly to the clock inputs of microcontroller 312. In other embodiments, third party device 328 and accessory device 300 may include a separate communication link (not shown) dedicated to the transfer of timing information. Calibrating microcontroller 312 via timing information received from third party device 328 or portable electronic device 326, or both, will be described in greater detail below in connection with FIG. 4.

In some embodiments, timing information may be requested from multiple devices, instead of only from third party device 328. For example, timing information may be requested from both third party device 328 and portable electronic device 326. Microcontroller 312 may control switch 310 to transmit the same timing independent request via both power supply line 314 and power supply line 318. Thus, each request can be signaled to both third party device 328 and portable electronic device 326 substantially concurrently. Alternatively, switch 310 may be controlled to selectively signal requests to one or more particular devices. For example, switch 310 may provide a first voltage value $V_{x1}$ for third party device 328 and a second voltage value $V_{x2}$, for portable electronic device 326. Microcontroller 312 may selectively change one of these voltage signals to initiate a request with one of these devices. Microcontroller 312 may be configured to select a particular device to receive a request for any suitable reason. For example, microcontroller 312 may be configured to transmit a request to only those ports that have devices coupled to them. Similarly, microcontroller 312 may be configured to send a request to a device coupled to either the highest or lowest priority port. Port priorities and other determinations that microcontroller 312 may use to control one or more voltages $V_x$ are discussed in greater detail in the docking application, for example.

Accessory device 300 may transmit timing independent requests for timing information via power supply line 314. This technique may be advantageous because an extra communication link dedicated to transmissions of timing independent requests is not necessary. Moreover, many devices (e.g., the wireless headsets described in the headset application) may already be capable of detecting changes in their power supply voltage, and would not require a substantial amount of extra circuitry to detect requests for timing information. However, it should be understood that in other embodiments, a different communication link can be used to transmit requests (e.g., TX/RX link 320) or an extra communication link can be implemented that is dedicated to the transmission of these requests.

Referring now to FIG. 4, an illustrative block diagram of clock calibration circuit 400 is shown for providing timing information to a microcontroller. Calibration circuit 400 can be implemented as part of accessory device 300 of FIG. 3 to provide appropriate timing information to microcontroller 312. Clock calibration circuit 400 can include selection circuit 402, tri-state buffer 404, and clock circuit 406.

Selection circuit 402 can derive a timing dependent signal useful for producing timing information from various inputs, illustrated in FIG. 4 as inputs CLK1 through CLKN, for example. Two clocks, CLK1 and CLK2, may be provided, for example, from third party device 328 and portable electronic device 326 of FIG. 3 via communications lines 320 and 322, respectively. Thus, selection circuit 402 may be configured to allow a subset of signals received from other devices to affect the timing information eventually provided to the microcontroller (e.g., microcontroller 312 of FIG. 3). In some embodiments, selection circuit 402 may be implemented as a single pole, double throw switch, and may select one of the CLK inputs to output as the timing independent signal. Selection circuit 402 may make this selection based on the value of a SELECT input 410, for example. In other embodiments, selection circuit 402 may average two or more of the clock inputs. For example, selection circuit 402 may average the signal values of CLK1 and CLK2 to obtain a new timing dependent signal. In still other embodiments, selection circuit 402 may be operable to either select a single CLK input or average multiple CLK inputs based on, for example, the value of SELECT input 410.

SELECT input 410, which may control the selection operation of selection circuit 402, may be derived from the microcontroller (e.g., microcontroller 312 of FIG. 3). The microcontroller can select a particular operation based on any suitable factors. In some embodiments, the microcontroller may enable the selection of one or more clocks of greatest magnitude, or may enable selection based on quality of the input clock signals. Alternatively, the microcontroller may choose one or more clocks based on the ports that the CLK input signals originated from.

With continuing reference to FIG. 4, tri-state buffer 404 can be configured according to an ENABLE input 412 to allow a signal to pass through buffer 404, for example, only when the electronic device (e.g., accessory device 104 of FIG. 1) is in a CALIBRATION state. For the example of FIG. 2, tri-state buffer 404 may be enabled to pass its input data to its output between time $t_1$ and time $t_3$, (e.g., the period of time that timing information may be requested). While the electronic device is in a COMMUNICATION state, on the other hand, tri-state buffer 404 may be configured to output high impedance. In this way, tri-state buffer 404 can prevent a different type of signal (e.g., a data signal, a timing independent signal), or a signal transmitted at a frequency other than the desired frequency, from affecting the internal oscillator of the microcontroller. ENABLE input 412, which may control the state of tri-state buffer 404, may be controlled by the microcontroller. Thus, at the time that the microcontroller requests timing information, the microcontroller can also enable tri-state buffer 404. Then, once the microcontroller determines that its internal oscillator has finished recalibrating, it can disable tri-state buffer 404.

Clock circuit 406 of calibration circuit 400 can include any suitable circuitry to convert the timing signal provided by selection circuit 402 to one or more Xtal input(s) 408 in a format expected by the clock input of the microcontroller (e.g., microcontroller 312 of FIG. 3). In some embodiments, clock circuit 406 may change the characteristics (e.g., voltage or current) of the timing signal. Also, clock circuit 406 may include any passive components, such as resistors or inverters, that would have been necessary even if a reliable clock source were present in the microcontroller. In some embodiments, clock circuit 406 may improve the quality of the signal provided by selection circuit 402. For example, clock circuit 406 may include an operational amplifier-based comparator for improving the edges of the signal provided by tri-state buffer 404.

Referring now to FIG. 5, an illustrative block diagram of a third party device 500 is shown in accordance with an embodiment of the invention. In some embodiments, the block diagram of FIG. 5 is a more detailed, yet still simplified, view of third party device 102 of FIG. 1 or third party device 328 of FIG. 3. Thus, third party device 500 can be coupled to accessory device 300 of FIG. 3, for example, by coupling port 514 of device 500 to port 306 of accessory device 300 of FIG. 3. Third party device 500 can include power bus 502, battery 504, detector 506, clock source 508, processing circuitry 510, communications circuitry 512, and I/O lines Vcc/Vdd and TX/RX.

The block diagram of third party device 500 is merely illustrative. For clarity, the components of third party device 500 will be described below mainly in terms of their ability to detect requests for timing information and to provide timing information in response to detecting these requests. However, it should be understood that third party device 500 can have many functions and functionalities, and any additional components, such as those described in the headset application. Moreover, each component of third party device 500 may have any of the features or embodiments described in connection with one or more corresponding components in the headset application.

Processing circuitry 510 can be any suitable combination of hardware, software, or firmware, and any accompanying components (e.g., memory elements) necessary for controlling the operation of third party device 500. Although processing circuitry 510 is shown as a single component, third party device 500 may instead have multiple processing circuitries that each have their own specialized functions.

In some embodiments, processing circuitry 510 can provide information to and process information obtained from an accessory device coupled through port 514, such as accessory device 300 of FIG. 3. Processing circuitry 510 may communicate with an accessory device using a timing dependent protocol (e.g., a serial protocol), where the data rate of communication is based on a clock signal provided by clock source 508, for example. Clock source 508 can be any suitable clock source that provides a reliable clock signal, such as a crystal oscillator, and may be the same or a similar clock source as described above in connection with clock source 108 of third party device 102 of FIG. 1.

Third party device 500 may include communications circuitry 512 to accurately exchange information with an accessory device coupled via port 514. In some embodiments, communications circuitry 512 may include an encoder to convert information provided by processing circuitry 510 to information suitable for transmission from device 500, or to convert the information to a standard transmission format (e.g., USB). Similarly, communications circuitry 512 can include any necessary circuitry for interpreting information obtained from the coupled accessory device, such as detectors, error control decoders, or USB decoders, for example.

As described above, a third party device, such as third party device 500, can be a portable electronic device. For example, third party device 500 can be a wireless headset. Third party device 500 can include a battery 504 to provide power to the other components of device 500 (e.g., processing circuitry 510, communication circuitry 512, etc.). Battery 504 may be any suitable portable powering device, such as a lithium ion battery, for example.

Power can also be provided to third party device 500 via one or more power supply lines. In particular, when an accessory device is coupled to device 500 via port 514, for example, third party device 500 can draw power from the accessory device using one or more power supply lines. For example, when third party device 500 is connected to accessory device 300 of FIG. 3, third party device 500 can obtain power from power supply line 314 of accessory device 300. The power supply line can be used to provide power of any suitable voltage (e.g., 5V, 3.3V, $V_1$, $V_2$, etc.). The power provided by the power supply line can be transported to different areas of third party device 500, and to the various components of third party device 500, by power bus 502, for example. Power bus 502 can be any suitable power line for transporting power across third party device 500. In some embodiments, power bus 502 can be coupled to battery 504 and can be used to recharge battery 504.

The components of third party device 500 may be selectively powered by either power bus 502 or battery 504, or both. In some embodiments, power bus 502 can provide power to some or all of the other components of third party device 500 when power can be drawn from a device coupled to port 514. For example, power bus 502 can be used to power one or more of the components of third party device 500 (e.g., to all components but communications circuitry 512, which may be powered instead by battery 504). If power cannot be drawn from another device, the components of device 500 may instead be powered by battery 504. The determination as to which source may power the components of third party device 500 can be based on the detection results of detector 506. In other embodiments of the invention, each of the components of third party device 500 may be powered by battery 504 regardless of whether power can be drawn from another device. In such embodiments, the power provided to power bus 502 may be used solely to recharge battery 504.

With continuing reference to FIG. 5, detector 506 can be coupled to power bus 502 and can monitor the voltage on power bus 502. Detector 506 can provide a signal to processing circuitry 510 when an expected power voltage (e.g., $V_1$) on power bus 502 changes to a different voltage (e.g., $V_2$). As described above, timing information may be transmitted in response to detecting such a voltage change. To perform this detection, detector 506 can include any necessary components or circuitry, such as one or more voltage comparators or analog-to-digital converters ("ADCs"). For example, to detect when the voltage on power bus 502 drops from $V_1$ to $V_2$, a voltage comparator can be used to detect when the voltage dips below a certain voltage, (e.g., below a voltage V, where $V_1 > V > V_2$). In some embodiments, detector 506 can be powered by battery 504 to provide a substantially constant power source while monitoring the voltage on power bus 502.

Processing circuitry 510 can be configured to react to a particular voltage change on power bus 502 detected by detector 506 (e.g., from $V_1$ to $V_2$). Thus, when detector 506 detects a request for timing information, processing circuitry 510 can react by having timing information sent via the TX/RX line. For example, if processing circuitry 510 includes a microprocessor, a detected voltage change on power bus 502 may trigger an interrupt sequence to be initiated. This interrupt sequence may include instructions to output timing information via TX/RX line through communications circuitry 512.

Third party device 500 and accessory device 300 may be operable to communicate according to timing diagram 200 of FIG. 2, thereby enabling accessory device 300 to recalibrate its microcontroller clock 311 based on a reliable clock source of third party device 500. Alternatively, another suitable handshaking protocol may be used between the two devices. One such alternative protocol is illustrated by timing diagram 600 of FIG. 6.

Figure 6:
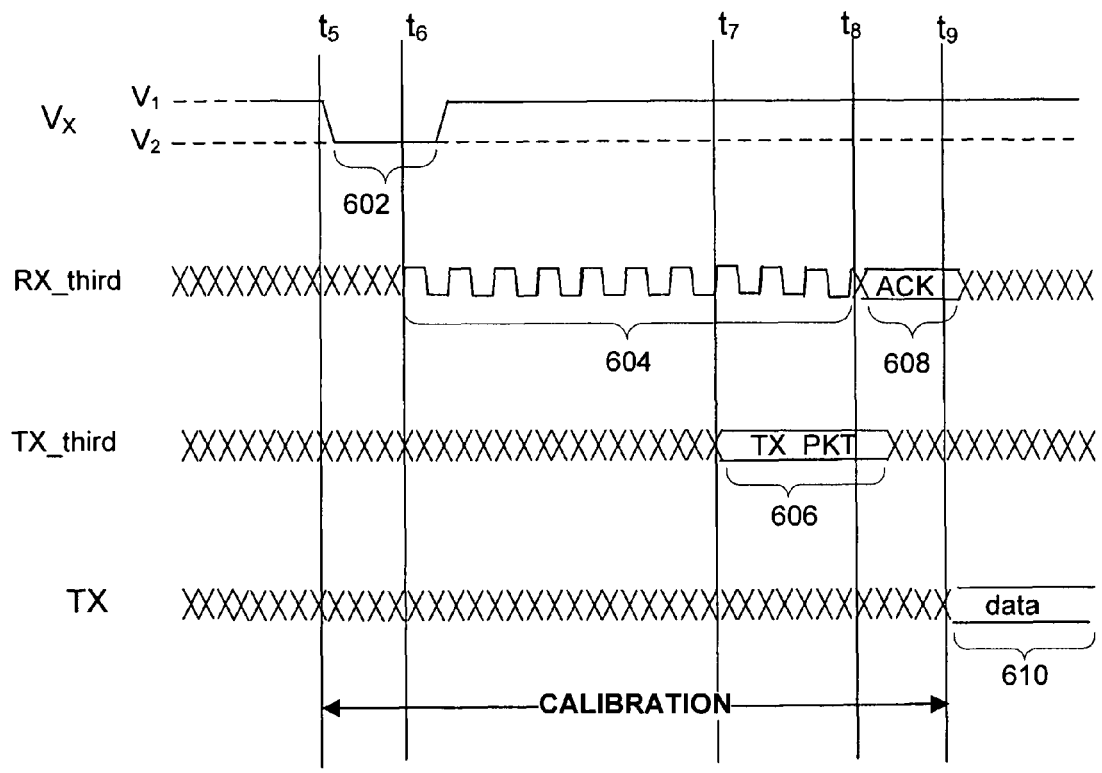
FIG. 6 shows another illustrative timing diagram for calibrating a microcontroller clock in accordance with an embodiment of the invention.

FIG. 6 will be described in connection with accessory device 300 and third party device 500. Timing diagram 600 illustrates four waveforms: the first representing the voltage of power supply line 314 provided from accessory device 300 to third party device 500 ($V_x$), the second representing the information received by accessory device 300 from third party device 500 via TX/RX line 320 (RX_third), the third representing the information transmitted by accessory device 300 and received by third party device 500 via TX/RX line 320 (TX_third), and the fourth representing information transmitted by accessory device 300 to another electronic device (e.g. portable electronic device 326) via TX/RX line 322 (TX).

At time $t_5$, accessory device 300 can request timing information from third party device 500 by changing power supply voltage $V_x$, from a first voltage, $V_1$, to a second voltage, $V_2$, for example. In particular, at this time, microcontroller 312 of accessory device 300 can enter into a CALIBRATION state, and can be configured to change the state of switch 310 to create pulse 602. Microcontroller 312 of accessory device 300 can generate pulse 602 for a period of time sufficient for third party device 500 to detect the change.

Once third party device 500 detects the voltage change at time $t_6$ (e.g., via detector 506), third party device 500 may begin transmitting timing information 604 to accessory device 300. The timing information may be used by device 300 to calibrate internal oscillator 311 of its microcontroller 312.

At time $t_7$, microcontroller 312 of accessory device 300 may transmit a packet of information to third party device 500 using a timing dependent format. The packet may therefore be transmitted at a rate dependent on the internal oscillator 311 of microcontroller 312. This timing dependent packet is illustrated in timing diagram 600 as TX_PKT 606, where TX_PKT 606 may be any suitable digital sequence or pattern of any suitable length. The sequence or pattern transmitted by accessory device 300 may be known and expected by third party device 500. If third party device 500 is able to accurately interpret TX_PKT 606 at time $t_8$, proper clock calibration can be assumed. In response to accurately receiving TX_PKT 606, third party device 500 may stop transmitting timing information 604, and may instead transmit acknowledgment ("ACK") 608 to accessory device 300.

Upon receiving acknowledgement 608 of proper clock calibration from third party device 500 at time $t_9$, accessory device 300 may switch from CALIBRATION state to COMMUNICATION state. Accessory device 300 can initiate timing dependent communication with third party device 500 or with any other suitable electronic device (e.g., portable electronic device 326 of FIG. 3). In particular, accessory device 300 may transmit data 610 to another device using a suitable timing dependent protocol (e.g., USB). Other tasks device 300 may perform are discussed above in connection with timing diagram 200 of FIG. 2.

In some scenarios, proper clock calibration may not have completed by $t_7$. In this case, timing dependent communication may not be possible between third party device 500 and accessory device 300. Therefore, at time $t_8$, if third party device 500 is not able to accurately interpret TX_PKT 606 transmitted from accessory device 300, third party device 500 may not send acknowledgement 608. In this scenario, accessory device 300 may continue to calibrate its clock according to timing information 604, and can transmit TX_PKT 606 again at a later time. Third party device 500 may send an acknowledgement once a subsequent TX_PKT is received accurately. Thus, accessory device 300 may continue to calibrate its microcontroller clock and send packets to third party device 500 as many times as is necessary (unless a timeout is implemented) to enable timing dependent communication.

Figure 7:
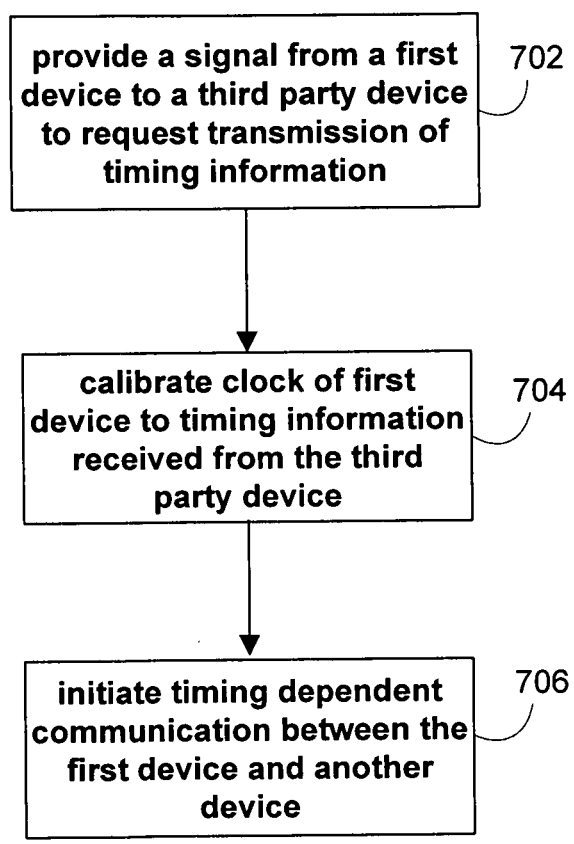
FIGS. 7 and 8 show illustrative flow diagrams for initiating communication with an electronic device in accordance with various embodiments of the invention.

Referring now to FIG. 7, an illustrative flow diagram of a process 700 is shown for enabling time dependent communication (e.g. using a serial protocol) between a first electronic device (e.g., accessory device 300 of FIG. 3) and a second electronic device (e.g., portable electronic device 326). The first electronic device can execute the steps of process 700.

At step 702, the first electronic device may transmit a signal to a third party device (e.g., third party device 500 of FIG. 5). The signal can be transmitted to request transmission of timing information from the third party device. In some embodiments, the signal may be timing independent and may be provided by changing the power supply voltage of the third party device. For example, the voltage of the power line may be changed from a normal voltage of $V_1$ (e.g., 5V) to a voltage substantially less than $V_1$ (e.g., 3.3V). Changing the voltage in this way may allow for transition-based signaling or level-based signaling, neither of which is necessarily dependent on the rate of communication.

After transmitting a request for timing information, the first electronic device may receive the requested timing information. The timing information may be received after a period of time corresponding to the time it takes for the third party device to detect the request, process the request, and transmit the timing information. The timing information can be of any suitable form, such as a clock signal with a suitable duty ratio (e.g., 50%, etc.) or a timing dependent signal with a suitable signaling pattern. At step 704, a microcontroller clock of the first device can be calibrated using the received timing information. For example, the timing information or a processed version of the timing information received from the third party device may be provided to one or more clock inputs of the microcontroller.

With continuing reference to FIG. 7, at step 706, the first electronic device can initiate timing dependent communication with another electronic device (e.g., the second electronic device). The timing dependent communication can be of any suitable format or standard, such as a USB standard. Also, the second electronic device can be any other device, including but not limited to the third party device. For example, timing dependent communication can be initiated with portable electronic device 326 of FIG. 3, which may be an iPod™ or iPhone™. The timing dependent communication can be initiated at a rate based on the rate of the internal microcontroller clock of the first electronic device. Thus, the ability of the timing dependent communication may depend on the success of the calibration of the internal oscillator at step 704.

Any normal, timing dependent or timing independent functions can be performed after the steps of process 700 are completed. These may involve performing any tasks that would have been performed even if clock calibration from a third party device were not necessary. In some embodiments, information may be exchanged with the other devices. In fact, any suitable tasks may be performed at this point, including checking connections between various devices, establishing connections between various devices, providing updates to various devices, or facilitating the transfer of data between various devices, for example.

It should also be understood that process 700 of FIG. 7 and any other process described below are merely illustrative. In fact, any of the shown steps of process 700 or other processes may be omitted or modified, and any additional steps may be performed without departing from the scope of the invention.

Figure 8:
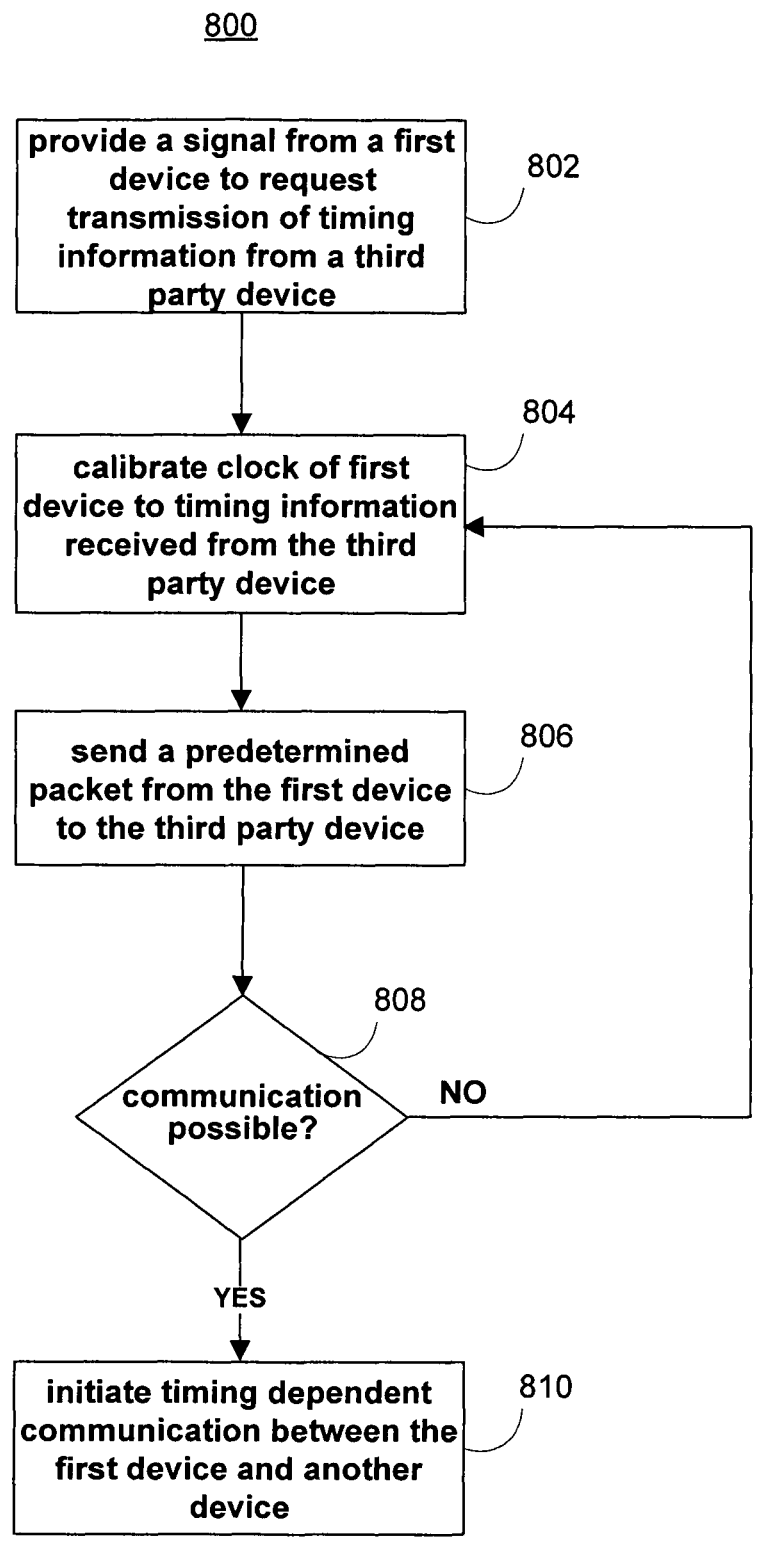

Referring now to FIG. 8, an illustrative flow diagram of a process 800 is shown for calibrating a microcontroller of a first electronic device (e.g., microcontroller 312 of accessory device 300 of FIG. 3) using timing information from a third party device (e.g., third party device 500 of FIG. 5). The steps of the flow diagram are alternative steps for those shown in FIG. 7, and can also enable the first electronic device to communicate with a second electronic device (e.g., portable electronic device 326 of FIG. 3) using a timing dependent protocol. These steps differ from those of process 700 at least because process 800 ensures that proper calibration of the microcontroller clock has occurred before initiating communication with the second electronic device.

Similar to step 702 and step 704 described above, at step 802 and step 804, the first electronic device can transmit a request for transmission of timing information to the third party device and can calibrate its microcontroller clock based on the timing information received from the third party device.

Then, at step 806, the first electronic device can transmit a predetermined packet of data to the third party device. The predetermined packet can be of any suitable length and of any suitable pattern. The predetermined packet may be chosen such that it is unlikely to be interpreted correctly by the third party device unless the packet is transmitted at an accurate data rate. Thus, if the third party device can correctly receive the packet, accurate microcontroller clock calibration can be assumed. At step 808, the first electronic device can determine whether communication with the third party device is possible. This determination may involve receiving an acknowledgement from the third party device if the third party device is able to correctly interpret the predetermined packet. If communication is possible, the first electronic device can initiate timing dependent communication with another electronic device at step 810.

If, according to the determination at step 808, communication is not yet possible, process 800 may move back to step 804, and the first electronic device may again calibrate its microcontroller clock at step 804. Alternatively, process 800 may instead return to step 802, and the first electronic device may again request transmission of timing information from the third party device. The first electronic device may determine that communication is not possible at step 808, for example, if no acknowledgement is received from the third party device within a predetermined amount of time. Thus, using the steps of flow diagram 800, the internal oscillator of the microcontroller may continually be calibrated until, at step 808, it is accurate enough for timing dependent communication.

Figure 9:
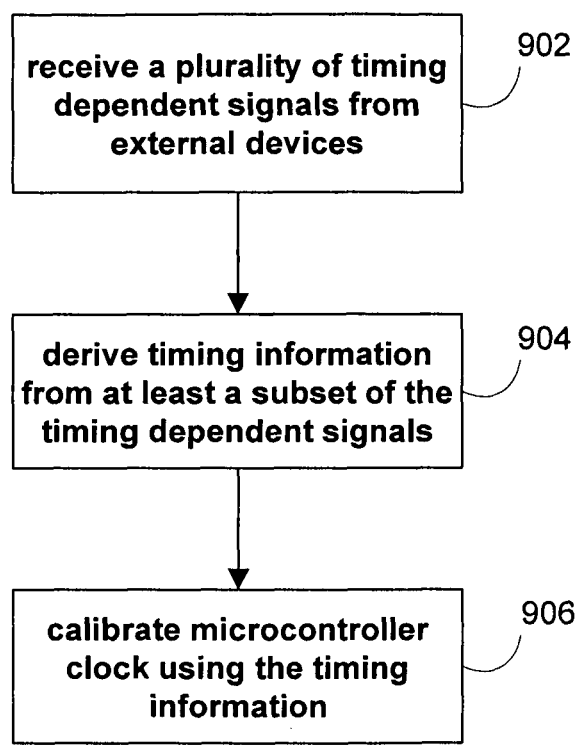
FIG. 9 shows an illustrative flow diagram for calibrating a microcontroller clock based on a plurality of timing signals in accordance with an embodiment of the invention.

Referring now to FIG. 9, an illustrative flow diagram of a process 900 is shown for deriving timing information from at least a subset of a plurality of received timing dependent signals. A suitable electronic device, such as accessory device 300 of FIG. 3, can execute the steps of process 900. At step 902, a plurality of timing dependent signals may be received. The plurality of timing dependent signals may be received from a plurality of different electronic devices. For example, accessory device 300 can receive a plurality of timing dependent signals from portable electronic device 326 and third party device 328 of FIG. 3. At step 904, timing information can be derived from at least a subset of the timing dependent signals. In some embodiments, some or all of the timing dependent signals may be averaged. In other embodiments, one of the timing dependent signals may be selected based on any suitable criteria. For example, a timing dependent signal may be selected based on which signal has the largest peak magnitude or based on which signal is obtained from the highest or lowest priority port. Then, at step 906, the first electronic device can calibrate its microcontroller clock using the timing information derived from the plurality of timing dependent signals.

Figure 10:
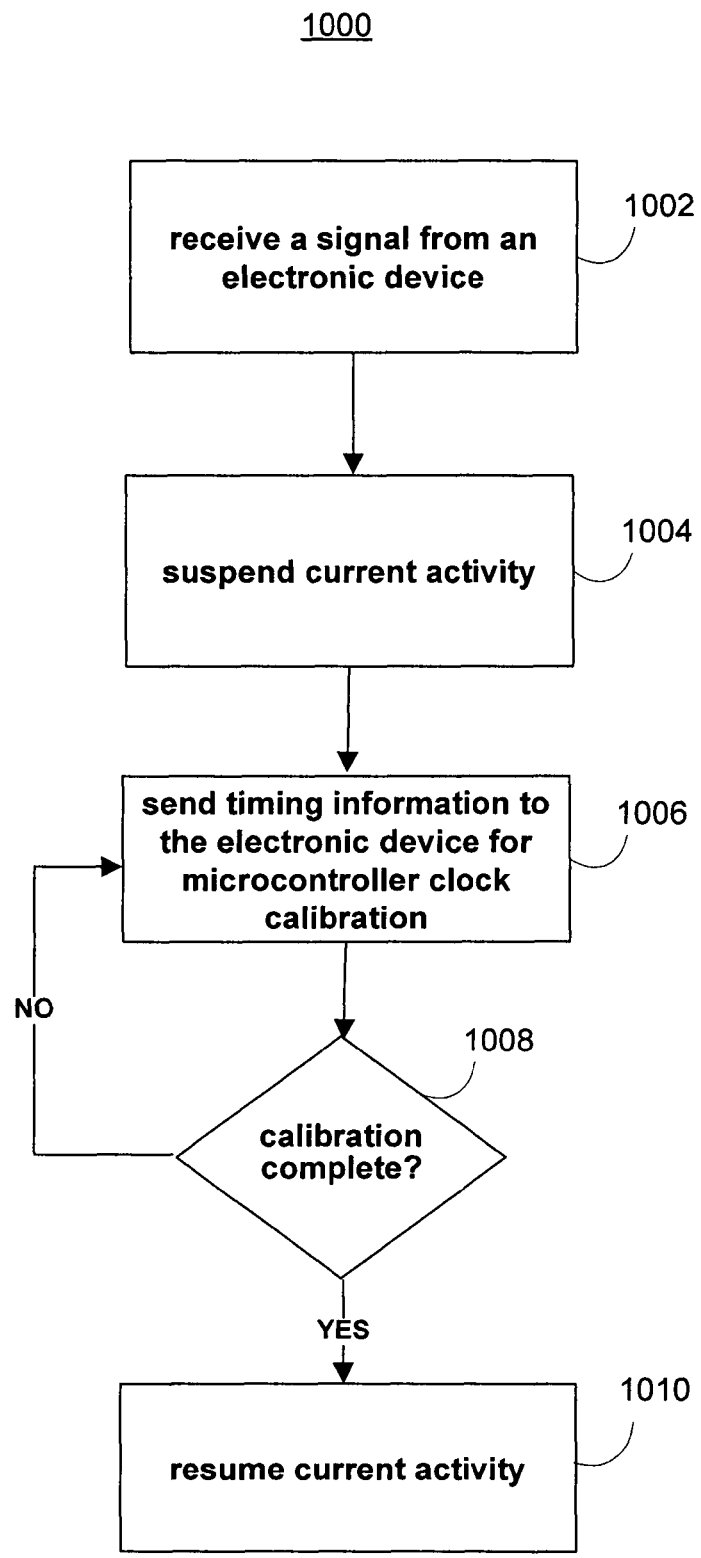
FIG. 10 shows an illustrative flow diagram for transmitting a timing signal for clock calibration in accordance with an embodiment of the invention.

Referring now to FIG. 10, an illustrative flow diagram of a process 1000 is shown for transmitting timing information for clock calibration in accordance with an embodiment of the invention. Process 1000 can be executed by a third party device in order to provide timing information to another electronic device. For example, process 1000 can be executed by third party device 500 of FIG. 5 to provide timing information to accessory device 300 of FIG. 3, thereby allowing accessory device 300 to calibrate its microcontroller clock.

At step 1002 of process 1000, the third party device may receive a signal from an electronic device (e.g., accessory device 300 of FIG. 3). The signal may be a timing independent signal and may be a level-triggered or transition-triggered signal, which may be sent as a request for timing information. In some embodiments, the timing independent signal may be detected in the form of a voltage change on a power line or another suitable communication link.

In response to receiving the timing independent signal, the third party device can suspend its current activity at step 1004. For example, if the third party device is communicating with another electronic device or is running any suitable program, the third party device can suspend operation of these functions. Then, at step 1006, the third party device may send timing information to the electronic device that requested timing information. The electronic device may use this timing information to calibrate its microcontroller clock.

At step 1008, the third party device can determine whether calibration of the electronic device's microcontroller clock is complete. The third party device may make this determination based on a packet sent by the electronic device, or may assume that calibration is complete once a predetermined period of time passes. If, at step 1008, the third party device determines that clock calibration is not complete, the third party device can continue to send timing information to the electronic device at step 1006. Alternatively, process 1000 can move back to step 1002, and the third party device can wait for a new signal from the electronic device that requests completion of clock calibration. If, according to the determination at step 1008, clock calibration has completed, the third party device can, at step 1010, resume any of the activities that it may have previously suspended at step 1004.

It should be understood that the flow diagram of process 1000 illustrated in FIG. 10 is merely illustrative. For example, in some embodiments, the third party device may not need to suspend any activities in order to transmit timing information. Alternatively, rather than suspending current activities, timing information may be transmitted once any current operations are completed.

Figure 11:
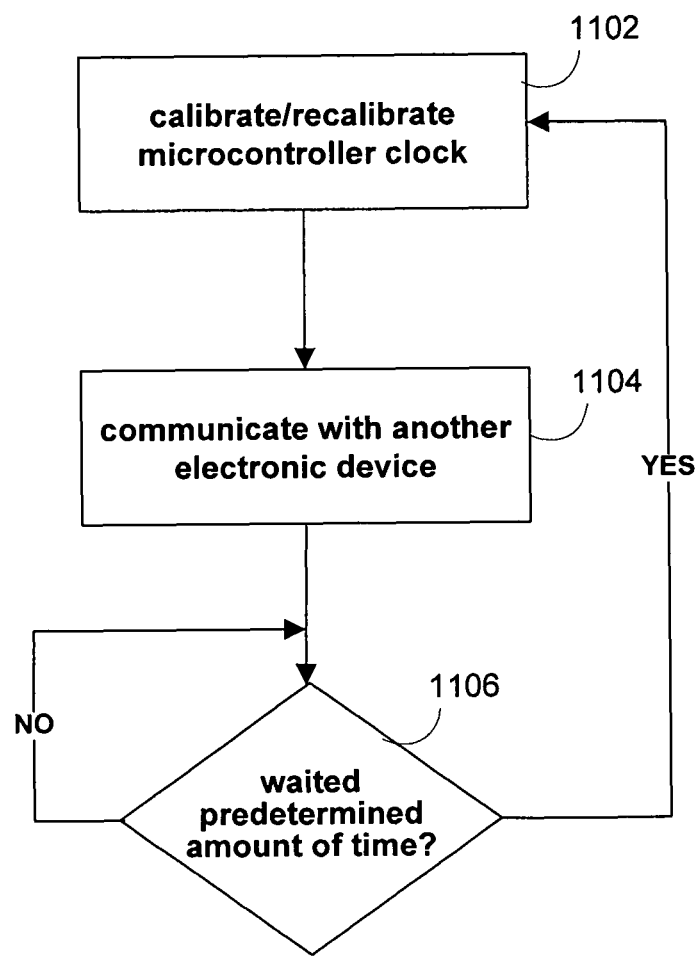
FIGS. 11 and 12 show illustrative flow diagrams for maintaining communication with a second device in accordance with various embodiments of the invention.
Figure 12:
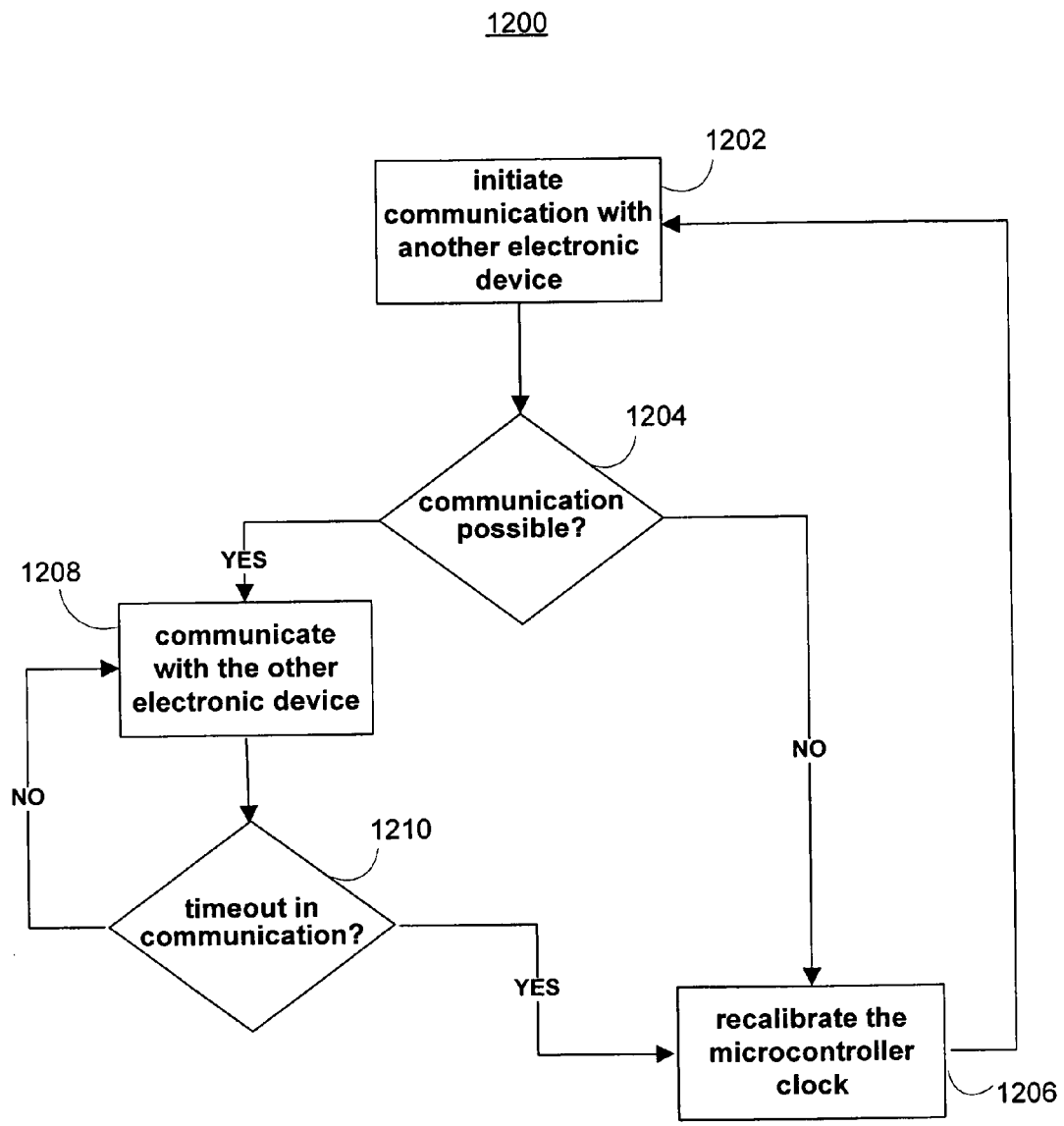

FIGS. 11 and 12 show illustrative flow diagrams of processes 1100 and 1200, respectively, for maintaining communication between a first electronic device (e.g., accessory device 300 of FIG. 3) and a second electronic device (e.g., portable electronic device 326 of FIG. 3) in accordance with various embodiments of the invention. Processes 1100 and 1200 can be executed by the first electronic device, such as accessory device 300 of FIG. 3. Thus, these flow diagrams illustrate two approaches for continually recalibrating the internal oscillator of the first electronic device's microcontroller (e.g., internal oscillator 311 of microcontroller 312 of FIG. 3) to ensure that timing dependent communication remains possible with the second electronic device.

Referring first to FIG. 11, the flow diagram of process 1100 is shown for maintaining communication with the second electronic device by periodically recalibrating the internal oscillator of a microcontroller irrespective of microcontroller clock accuracy. At step 1102, the first electronic device can calibrate or recalibrate its microcontroller clock. Calibrating the microcontroller clock may involve any of the steps described above in connection with FIGS. 7-10, for example. After clock calibration, the first electronic device can start communicating or resume communicating with the second electronic device at step 1104. After a predetermined amount of time (e.g., after one second, five seconds, one minute, etc.), the flow of process 1100 may again return to step 1102. That is, the microcontroller clock may again be recalibrated regardless of the accuracy of the internal oscillator. This approach may advantageously ensure that the internal oscillator remains accurate and reliable, and that communication capabilities do not cease.

Referring now to FIG. 12, another flow diagram is shown that illustrates a process for allowing a first electronic device to initiate and/or maintain communication with a second electronic device. In process 1200, the microcontroller of the first electronic device is recalibrated only when necessary.

At step 1202, the first electronic device may initiate communication with the second electronic device. The communication may be based on a timing dependent protocol, such as a USB protocol. At step 1204, the first electronic device may determine whether communication is possible with the second electronic device. In some embodiments, the determination can be made based on whether the second electronic device responds appropriately to any information transmitted at step 1202, such as with a return acknowledgment or with any requested information. If, at step 1204, the first electronic device determines that communication is not possible, the first electronic device may recalibrate its microcontroller clock at step 1206. Recalibrating the microcontroller clock may involve any of the steps described above in connection with FIGS. 7-11. Once recalibrated, communication with the other device may again be initiated at step 1202.

If, based on the determination at step 1204, communication is possible with the second electronic device, the first electronic device may continue to communicate or start to communicate at step 1208 with the second electronic device. In some embodiments, actual data transfer between the two devices may begin at step 1208, as proper communication has been established. Then at step 1210, the first electronic device can determine whether a timeout in communication has occurred with the second electronic device. For example, a timeout in communication may occur when the second electronic device does not respond to information requests sent by the first electronic device within a predetermined amount of time. If the first electronic device determines that a timeout in communication has not occurred, the first electronic device can continue communicating with the first electronic device at step 1208. Otherwise, process 1200 can move to step 1206, and the first electronic device can recalibrate its internal microcontroller clock. Thus, when communication ceases, the first electronic device can assume that its microcontroller clock has lost accuracy, and can recalibrate its microcontroller clock to regain communications capabilities.

The foregoing describes systems and methods for calibrating the internal oscillator of a microcontroller based on a remote clock source. Those skilled in the art will appreciate that the invention can be practiced by other than the described embodiments, which are presented for the purpose of illustration rather than of limitation, and the invention is limited only by the claims which follow.

What is claimed is:

1. A method of enabling timing dependent communication between a first electronic device and a second electronic device, comprising:
    transmitting a timing independent signal from the first electronic device to a third party device to request transmission of timing information, wherein the timing independent signal is comprised of a voltage change in the timing independent signal that is detectable by the third party device;
    calibrating a clock source of the first electronic device based on the timing information transmitted from the third party device and received by the first electronic device, wherein the timing information is comprised of a clock signal; and
    conducting the timing dependent communication between the first electronic device and the second electronic device, wherein a data rate of the timing dependent communication is based on a clock rate of the clock source.

2. The method of claim 1, wherein the transmitting the timing independent signal comprises pulsing a voltage of the timing independent signal.

3. The method of claim 1, wherein the third party device comprises a reliable clock source, and wherein the timing information is derived from the reliable clock source.

4. The method of claim 3, wherein the reliable clock source is a crystal oscillator.

5. The method of claim 1, further comprising transmitting a timing dependent signal from the first electronic device to the third party device to end transmission of the timing information.

6. The method of claim 1, further comprising:
    transmitting a predetermined packet from the first electronic device to the third party device using a timing dependent protocol;
    ending the calibrating of the clock source in response to the first electronic device receiving an acknowledgement of receipt of the predetermined packet from the third party device; and
    retransmitting the predetermined packet from the first electronic device to the third party device when the acknowledgement is not received by the first electronic device.

7. The method of claim 1, wherein the timing independent signal is a first timing independent signal, the method further comprising:
    transmitting a second timing independent signal from the first electronic device to the third party device subsequent to the transmitting the first timing independent signal to request transmission of additional timing information; and
    recalibrating the clock source based on the additional timing information transmitted from the third party device and received by the first electronic device.

8. The method of claim 7, wherein the second timing independent signal is automatically transmitted a predetermined amount of time after the transmitting the first timing independent signal.

9. The method of claim 7, wherein the second timing independent signal is transmitted after the conducting the timing dependent communication ceases for a timeout period of time.

10. A method of transmitting timing information from a first electronic device to a second electronic device, wherein the first electronic device comprises a reliable clock source, and wherein the second electronic device comprises a microcontroller with an internal oscillator, the method comprising:
    receiving a timing independent signal from the second electronic device with the first electronic device, wherein the timing independent signal is comprised of a voltage change in the timing independent signal that is detectable by the first electronic device;
    detecting a request for the timing information from the received timing independent signal with the first electronic device; and
    transmitting the timing information from the first electronic device to the second electronic device, wherein the timing information is derived from the reliable clock source, wherein the timing information is comprised of a clock signal, and wherein the timing information is used by the second electronic device to calibrate the internal oscillator of the microcontroller.

11. The method of claim 10, wherein the detecting the request comprises detecting a voltage change of the timing independent signal.

12. The method of claim 10, further comprising powering the first electronic device using the timing independent signal.

13. A system, comprising:
    a third party device comprising a reliable clock source, wherein the third party device is configured to transmit timing information derived from the reliable clock source in response to receiving a timing independent request, wherein the timing independent signal is comprised of a voltage change in the timing independent signal that is detectable by the third party device, wherein the timing information is comprised of a clock signal; and a first electronic device coupled to the third party device, wherein the first electronic device comprises a microcontroller with an internal oscillator, and wherein the first electronic device is configured to:
  transmit the timing independent request to the third party device; and
  calibrate the internal oscillator with the timing information received from the third party device.

14. The system of claim 13, wherein the third party device is a wireless headset, and wherein the reliable clock source is a crystal oscillator.

15. The system of claim 13, wherein the first electronic device is a docking device adapted to be an accessory device for the third party device.

16. The system of claim 13, further comprising a second electronic device for communicating with the first electronic device using a timing dependent protocol.

17. The system of claim 16, wherein the second electronic device is a portable media player.

18. An electronic device, comprising:
  a first communication link for transmitting, to a second electronic device, a request for timing information using a timing independent protocol,
    wherein the second electronic device comprises a reliable clock source, wherein the timing independent protocol is comprised of a voltage change in a timing independent signal that is detectable by the second electronic device;
  a second communication link for receiving the timing information, wherein the timing information is comprised of a clock signal; and
  a microcontroller for controlling operations of the electronic device, wherein an internal oscillator of the microcontroller is calibrated based on the received timing information.

19. The electronic device of claim 18, wherein the first communication link is adapted for providing power to the second electronic device.

20. The electronic device of claim 18, further comprising:
  a regulator for providing a first voltage and a second voltage, wherein the first voltage is different from the second voltage; and
  a switch for selectively providing one of the first voltage and the second voltage to the first communication link, wherein the request for the timing information is transmitted by changing a state of the switch for a period of time.

21. A method of calibrating a clock source of a first electronic device for use in enabling timing dependent communication between the first electronic device and a second electronic device, the method comprising:
  transmitting a request for timing signals from the first electronic device to a plurality of third party devices using a timing independent protocol, wherein the timing independent protocol is comprised of a voltage change in a timing independent signal that is detectable by the plurality of third party devices;
  receiving a plurality of timing signals with the first electronic device from the plurality of third party devices in response to the request, wherein the plurality of timing signals is comprised of clock signals;
  deriving timing information with the first electronic device from at least a subset of the timing signals; and
  calibrating the clock source based on the timing information.

22. The method of claim 21, wherein the clock source is an internal oscillator of a microcontroller within the first electronic device.

23. The method of claim 21, wherein the deriving the timing information comprises averaging the at least a subset of the timing signals.

24. The method of claim 21, wherein the deriving the timing information comprises selecting one of the plurality of timing signals based on at least one magnitude of the timing signals and priorities of ports of the first electronic device that obtained each of the plurality of timing signals.

25. The method of claim 21, wherein the plurality of timing signals are received with the first electronic device from at least a subset of the plurality of third party devices.

* * * * *